Figure 1:
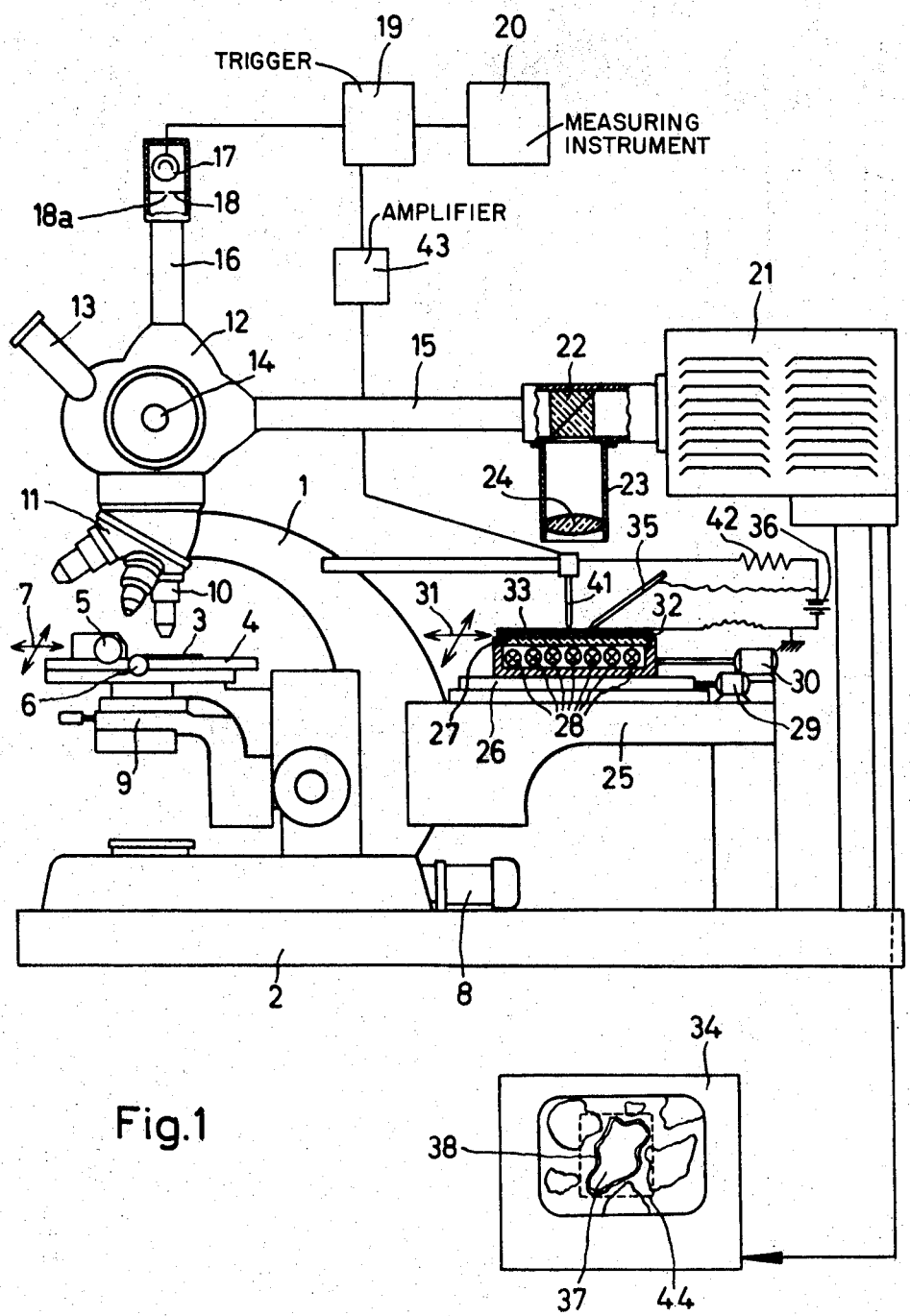

United States Patent

[11] 3,558,814

| [72] | Inventor | James L. Engle |
| --- | --- | --- |
| | | Oberkochen, Wurttemberg, Germany |
| [21] | Appl. No. | 711,711 |
| [22] | Filed | Mar. 8, 1968 |
| [45] | Patented | Jan. 26, 1971 |
| [73] | Assignee | Carl Zeiss-Stiftung, doing business as Carl Zeiss |
| | | Wuerttemberg, Germany |
| | | a corporation of Germany |
| [32] | Priority | Mar. 11, 1967 |
| [33] | | Germany |
| [31] | | Z12,F49 |

[54] METHOD AND APPARATUS FOR PLOTTING A SPECIFIC AREA OF AN OBJECT UNDER AN OBSERVATION INSTRUMENT
6 Claims, 2 Drawing Figs.

[52] U.S. Cl. .................................................. 178/6.8,
33/23, 250/216
[51] Int. Cl. ................................................. B43l 13/10,
H01j 3/14, H04n 7/18
[50] Field of Search ........................................ 33/1M,
23C, (Inquired), ; 178/6, Ind, F&M, 6.8; 250/206,
216, 234

[56] References Cited
UNITED STATES PATENTS

| 2,730,565 | 1/1956 | Owens | 178/6 |
| 2,927,219 | 3/1960 | Young | 250/216 |
| 3,459,888 | 8/1969 | Sokolou | 178/6 |

*Primary Examiner*—Bernard Konick
*Assistant Examiner*—Howard W. Britton
*Attorney*—Sandoe, Neill, Schottler & Wikstrom

ABSTRACT: This is a method and apparatus for measuring and plotting points in a specific area of an object wherein a larger area is scanned point by point and electric measuring and plotting means is used to measure and plot successive points as they are scanned. The actuation of the measuring and plotting means is controlled by a sensing peg moving over a surface, synchronously with the scanning of correspondingly successive points on the object. Said surface is formed by a layer of electrically conductive material on an insulating base and the conductive material is removed along a closed line around the image of the specific area to be measured and plotted, thereby to electrically insulate that portion of the surface from the surrounding portion. One of the surface portions and the sensing peg are connected in an electric circuit that is arranged to actuate the measuring and plotting means when the sensing peg is on the surface portion corresponding to said specific area and to take said means out of operation when the peg is on the other surrounding surface portion.

METHOD AND APPARATUS FOR PLOTTING A SPECIFIC AREA OF AN OBJECT UNDER AN OBSERVATION INSTRUMENT

The present invention is a method and apparatus for the quantitative plotting of a specific area of an object that is subjected to observation with an observation instrument, such as a microscope.

The photometric or interferometric plotting of the microscopic image of a biological cell is a typical example of the purpose of this invention. For instance it is sometimes desired to plot a specific cell or a portion of a cell, such as the cell plasma, nucleus or nucleoulus. This is ordinarily done by scanning the image of the object point by point, the scanning being accomplished by shifting the object or specimen, and hence the image, with respect to a stationary aperture. This, however, requires observing the image of the whole object during the scanning action through an eyepiece provided with a collimating mark, in order to control the scanning action to cover only the particular area of interest.

Plotting in this manner is necessarily rather time consuming, not very accurate, and extremely tiresome for the observer.

With the method and apparatus of the present invention these disadvantages are avoided, and in addition to other advantages this method and apparatus make it possible to accurately preselect a specific area of an object and to restrict the plotting to this preselected area.

In accordance with the invention the object being studied is placed on a horizontally movable stage of an observation instrument. The image of the object is projected onto a plate having an aperture therein and the stage is moved, so that the image is scanned, point by point, through the aperture, the light passing through the aperture being measured by electrical means for plotting the object. The plotting may be accomplished by converting the light intensity into analogue or digital values fed into an appropriate measuring instrument which plots the values.

A horizontally movable stage is connected to move synchronously with the object-stage in the same directions. A drawing surface formed by a sheet of electrical insulating material having a layer of metal thereon is carried on said movable stage, and the image of the object on the movable stage is optically projected together with an image of the drawing surface in an observation plane. The area of the image that corresponds to the specific area of the object which it is desired to plot is then outlined by drawing a closed line on the drawing surface while observing said superimposed images in the observation plane. During this drawing the metal is removed from along the line. The portion of the metal layer outside the outline is connected in an electric circuit and is insulated from the metal inside the outline by the line which forms the outline. An electrically conductive sensing peg resting on the drawing surface is electrically connected to permit the electrical plotting means, which plots the object, to operate so long as the peg rests on the portion of the metal layer inside the outline, but to take the plotting means out of operation if the peg is on the portion of the metal layer outside the outline. The means for moving the object-stage and the stage of the drawing surface synchronously are adapted to move them proportionally so that the movement of the drawing surface relative to the sensing peg corresponds to the movement of the object on the stage relative to the aperture of the scanning means.

The stage moving means are adapted to be set for moving the stage laterally a predetermined distance and then shift the stages longitudinally one line width and repeat the lateral movement for scanning a preselected rectangular area of the object. The rectangular area to be scanned is set to include the specific area within the outline marked on the drawing surface. Thus, as the object on the stage is moved in a rectangular scanning pattern, the sensing peg controls the operation of the means for measuring and plotting the light through the scanning aperture so that the latter means only operates in response to light from points on the object that are within the outline.

In one embodiment of the invention the image on the drawing surface is reproduced by a television camera in superimposed relation with the image of the object on a screen associated with the television camera to facilitate the setting of the rectangular scanning area, and the marking of the outline around the specific area to be plotted, when the object loading must be small and when the apparatus is operated in the ultraviolet spectral range.

Figure 2:
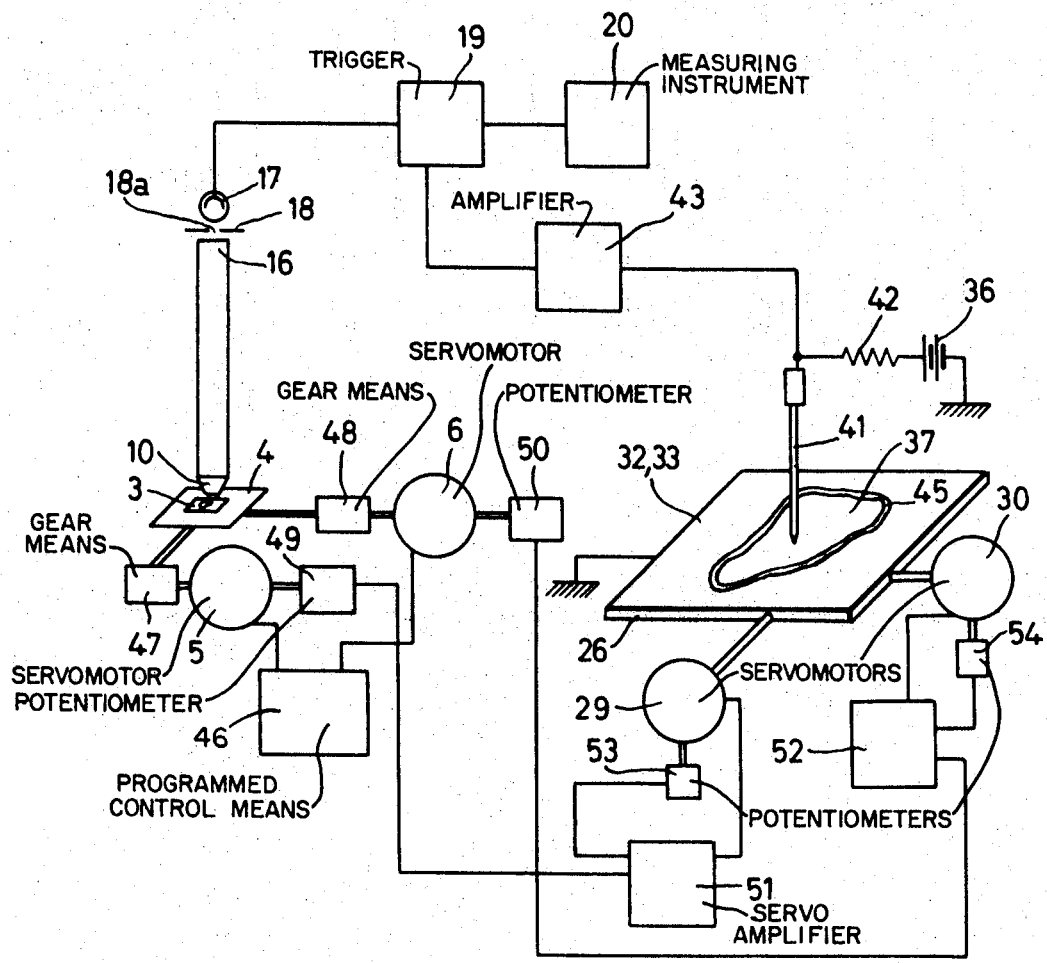

The invention will be hereinafter described with reference to the accompanying drawings which show one embodiment of the novel device, and in which:

FIG. 1 is a side elevation, partly in section, of apparatus including an observation instrument, scanning and measuring means, and reproducing means embodying the invention; and FIG. 2 is a schematic diagram of the apparatus shown in FIG. 1 except the television camera reproducing means which is illustrated in FIG. 1.

In FIG. 1 reference numeral 1 designates the stand of a microscope mounted on a base plate 2. The object 3 to be analyzed is arranged on a mechanical stage 4 which is adapted to be moved forward and back and side to side in a horizontal plane, as indicated by arrows 7, by means of the servomotors 5 and 6, shown schematically. Light from a light source 8 passes through a condenser 9, the object 3, and the microscope objective lens 10 mounted in the nosepiece head 11, and passing through optical means mounted in the eyepiece head 12, reaches the eyepiece 13. A magnified image of the object 3 is thus observable through the eyepiece 13 for locating the area of the object 3, which is to be scanned and measured, in the field of the microscope.

The eyepiece head 12 of the microscope includes a beam splitter (not shown) which is actuated by means of knob 14. According to the position of the beam splitter, light from the object 3 may be directed either to the eyepiece 13, to a lateral connection tube 15 or to a vertical connection tube 16. It is also possible to design the beam splitter so that the light is not only directed to one of the elements 13, 15 or 16, but simultaneously to any two of them, for instance, eyepiece 13 and connecting tube 15.

The connection tube 16 includes optical elements for projecting the image of the object 3 on the photocathode of photocell 17 through a scanning aperture 18a of a plate 18 that is between the photocell and the outward end of connection tube 16. The photocell 17 is connected through a trigger or gate 19 to a measuring instrument 20. The photocell 17 is responsive to the intensity of light through the scanning aperture 18a and sends corresponding electrical signals to the measuring instrument 20 which plots the signals. For example, the photocell 17 may be adapted to convert the light into analogue or digital value adapted to be measured and plotted by the measuring instrument 20.

The connection tube 15 includes optical elements for projecting the image of the object 3 on the cathode of the pickup tube of a television camera 21. The tube 15 also includes a beam-splitting cube 22. At the position of this cube the tube 15 is provided with a branch connection tube 23 that contains optical elements, indicated schematically by the lens 24.

The microscope stand 1 and the base plate 2 have rigidly connected thereto a table 25 on which there is mounted the schematically shown mechanical stage 26. On this stage there is mounted a transparent plane parallel plate 27 being illuminated as uniformly as possible by lights 28. Two servomotors 29 and 30 are acting to move the mechanical stage 26 forward and back and side to side in a horizontal plane, as indicated by the arrows 31.

In the operation of the apparatus a transparent sheet 32 is placed on the platform 26. The sheet 32 is a thin film of electrical insulating material such as a plastic, having a surface layer 33, of electrically conductive metal thereon. The metal layer may be deposited on the film by evaporation to form a coated sheet or film similar to a type used in the making of capacitors. The optical transmission of such films is approximately 2 percent for white light.

The light passing through the film 32, 33 passes through the optical element 24 and is then deflected by the beam-splitting cube 22 to be projected onto the photocathode of the television camera 21. The television camera 21 then reproduces on a reproducing screen 34, a composite image which is formed by the superposition of the image of object 3 and the image of the surface of film 32, 33. To avoid overradiations, the beam-splitting cube 22 is designed so that 90 percent of the light originating from the microscope passes through the cube 22 to the television camera 21 and only 10 percent comes from the surface of the film 32, 33.

A metallic stylus 35, preferably having a fine ballpoint, is connected to one pole of a DC voltage source 36 which supplies a voltage of from 6—15 volts; the other pole is connected to the metal layer 33 on sheet 32. When the point of the stylus 35 is placed in contact with the metal layer 33 the metal evaporates immediately, leaving a hole down to the insulating material below, which remains undamaged. By moving the stylus 35 along the metal layer 33, a line along which the metal is removed may be drawn on the metal layer 33, and by making the line a closed line the portion of the metal layer enclosed by the line is electrically insulated from the portion outside.

In operation of the apparatus shown in FIG. 1, the object 3 on the stage 4 is observed through the eyepiece 13, and the area of interest is selected. The knob 14 is then turned as required to direct the light from the object through the connecting tube 15 to the television camera 21. Thereby, the microscopic image of the object is reproduced on reproducing screen 34 (i.e., the display of the closed-circuit TV receiver) whereon the specific area of interest is referenced 37.

While observing the image on the reproducing device 34, the metallic stylus 35 is applied to the metal layer 33 of the sheet 32 and is moved manually along the outlines of the interesting image area 37. This removes metal from the layer 33 along a closed line outlining the area 37, the outline thus formed being designated by the numeral 45 in FIG. 2. The movement of the stylus 35 over the surface of the sheet 32, 33 can be observed on the reproducing screen 34 as a moving bright line. In this manner, it is possible to direct the movement of the stylus 35 around the perimeter of the area 37. In FIG. 1 the reproduction of the outline 45 on sheet 32, 33 appearing on the reproducing screen 34 is indicated at 38.

By thus removing the metal down to the insulating base of the sheet 32, 33 in the form of an outline 45 completely around the area 37, along a closed line, the portion of the metal layer 33 coinciding with the area 37 is insulated from the surrounding portion of the metal layer 33. The electrical resistance provided by the line through metal layer 33 between the portions of the layer separated thereby is more than 100 megohms. When the line is completed the stylus 35 is put aside (e.g., retracted by means not shown).

As seen in FIG. 1, a metallic sensing peg 41, which is supported on the stand 1, is in a fixed position engaging the metal layer 33 of the sheet 32 and is electrically connected both to the DC voltage source 36, through a resistor 42, and to the trigger 19, through an amplifier 43.

With the sensing peg 41 in contact with the metal layer 33 of sheet 32, the knob 14 is turned as required to direct light from the object 3 to the photocell 17, the light passing through the aperture 18a of plate 18 in front of the photocell. Then the servomotors 5 and 6 are actuated to move the mechanical stage 4, on which the object 3 rests, in horizontal directions, indicated by the arrows 7, for line scanning the rectangular image area referenced 44 in FIG. 1.

The servomotors 5 and 6 move the stage 4 by moving means of suitable gear trains, indicated respectively at 47 and 48 in FIG. 2. The operation of the servomotors 5 and 6 is controlled by a conventional control device, indicated at 46 in FIG. 2, which is adapted to be programmed to cause the stage 4 to be moved laterally a predetermined amount, then moved forward one line-space, then laterally again, and so on, for line scanning a rectangular area of preselected dimensions. As indicated in FIG. 1, the rectangular scanning area 44 is adjusted to surround and include the specific area 37 which it is desired to plot.

The superimposing of the image from the sheet 32, 33 on the image reproduced from the object 3 onto a reproducing screen 34 by means of the television camera 21, as described above, is particularly helpful for making the outline of the area 37 on the sheet 32, 33 and for programming the rectangular area 44 when the apparatus is operated in the ultraviolet spectral range or when the load of the object 3 by the light must be small. It will be appreciated, however, that the use of a television camera is not essential to the structure and method of operation of the apparatus of this invention, that means, also a direct observation of the microscopic image can be effected. In such case, provision is to be made that the image of the surface of the sheet 32, 33 will be superposed on such directly observed image.

The stage 26, which is moved by the servomotors 29, 30 in the direction of the arrows 31 is adapted to move in synchronism with the scanning movement of the stage 4 in such a way that each scanning point of the sheet 32, 33 has definitely associated therewith a corresponding point of the object 3.

For this purpose, tracking potentiometers 49 and 50 connected respectively to the servomotors 5 and 6 are provided. Upon movement of the servomotors these potentiometers are adjusted and supply signals passing to the servoamplifiers 51 and 52 respectively. These servoamplifiers are connected to control the operation of the servomotors 29 and 30 which move the stage 26. Potentiometers 53 and 54 are connected respectively between the servomotors 29 and 30 and the inputs of servoamplifiers 51 and 52 respectively for ensuring that the servomotors 5 and 29, and 6 and 30, run synchronously. The gear trains 47 and 48 between the servomotors 5 and 6 and the stage 4 are adapted to adjust the relative movements of the stage 4 and the stage 26 so that they move in proportion to the degree of magnification of the microscope.

It will be appreciated that purely mechanical couplings for moving the stage 4 and the stage 26 in synchronism could be substituted for the above-described electrically operated mechanism without altering the essential features and method of operation of the apparatus. Also the essential features and method of operation of the apparatus would be the same in essence if the aperture 18 (and photocell 17) and the sensing peg 41 were moved, synchronously, and the stage 4 and platform 26 were stationary rather than vice versa as in the exemplary embodiment of the invention described above.

At the start of the scanning operation of the apparatus, and after the outline of the area 37 has been drawn into the metal layer 33 of the sheet 32 on the stage 26, the scan-program device 46 is switched on. Now the stage 4 is moved in the sense of a scanning of a rectangular area of the object 3. At the same time, the stage 26 comprising the film 32, 33 is moved conformally. Thereby the sensing peg 41 scans the film 32, 33 within the rectangular area 44. This area comprises the area of interest 37 and therefore the outline 45.

As previously mentioned and as indicated in FIG. 2, the portion of the layer 33 outside the outline 45 is connected to the DC voltage source 36, the area within the outline 45 being insulated therefrom by the outline. In the structure illustrated, the trigger 19, the amplifier 43, the sensing peg 41 and the resistor 42 are connected in circuit with the DC voltage source 36 in such a way that when, during the synchronous movement of the stage 26, the sensing peg 41 is on the portion of the layer 33 within the outline 45 (which is insulated from the circuit), the trigger 19 is actuated to cause the measuring device 20 to operate to measure and plot the variations in intensity of the light directed to the photocell 17 by the scanning movement of the stage 4. When movement of the stage 26 moves the sheet 32, 22 so that the sensing peg 41 is on the portion of the metal layer 33 outside the outline 45, the peg 41 is thereby grounded, so that trigger 19 and the measuring and plotting device 20 are rendered effectively inoperative. In this way the apparatus of this invention controls the operation of the measuring and plotting device 20 so that only the points within a specific area of interest on the object are plotted.

I claim:

1. A method for the photometric analysis of a specimen, comprising the steps of producing an enlarged image of the specimen, scanning the enlarged image in a first predetermined scanning course, photometrically generating an electrical signal in response to said enlarged image as said scanning course proceeds, producing an image of a drawing surface, drawing on the drawing surface a closed line while simultaneously observing said images in superposed relation, said closed line being drawn as the outline of the field of the specimen to be measured, whereby the part of the drawing surface within the drawn outline is distinguishable from the part of the drawing surface outside of said outline, selecting a limited area of the drawing surface to be scanned, said limited area representing a scanning area which encloses the drawn outline, scanning said limited area in a second predetermined scanning course in a pattern that corresponds to that of said first predetermined scanning course, synchronously coordinating the instantaneous position and pattern of said scanning courses, probing the drawn surface to produce an electrical signal indicative of whether the instantaneous position within said second scan is within or without the drawn outline, and utilizing said last-mentioned signal to effectively suppress said first-mentioned signal during periods in which such probing senses that the scan is instantaneously outside the drawn outline.

2. The method of claim 1, in which the drawing surface comprises an electrically insulating base sheet having a thin removable electrically conductive outer surface; in which the drawing operation produces local removal of said thin surface, whereby that part of the conductive surface within the drawn outline is electrically insulated from that part of the conductive surface outside the drawn outline; and in which said probing step scans the drawing surface for local differences in electrical resistance.

3. Apparatus for photometric analysis of a specimen, comprising a first stage for supporting the specimen, an enlarging optical system including an aperture stop and positioned to place an enlarged image of the specimen at a plane including said stop, photoelectric means responsive to light passing said stop, a measuring device coupled to the output of said photoelectric means, and a two-coordinate drive for displacing said stage with respect to the axis of said optical system, whereby said stop is caused to scan a field which includes the specimen; a second stage having a drawing surface, means including an optical system and a viewing device positioned to create a viewable image of said drawing surface at said viewing device, means including an optical element in the first of said optical systems for imaging the specimen at said viewing device in superposed relation to the viewing of said drawing surface, a two-coordinate drive for displacing said second stage with respect to the axis of said second optical system, whereby the axis of said second optical system is caused to scan said drawing surface, said drives being proportionally synchronized to assure coordination in the viewed images of the specimen and the drawing surfaces, means for drawing on the drawing surface in the course of such coordinated drive whereby a closed line may be drawn as the outline of the field of the specimen while simultaneously observing the superposed images, whereby the drawn outline is distinguishable from the part of the drawing surface outside of the outline; means programming the operation of said drives to achieve coordinated scans of the respective fields of the specimen and of the drawn outline; means probing the drawing surface in the course of such coordinated-drive operation and producing an electrical output responsive to instantaneous positioning of the scan axis with respect to the drawn outline; and a control connection from the output of said probe means and operatively connected to effectively suppress the electrical signal from said photoelectric means to said measuring device when the instantaneous scan axis is outside the drawn outline.

4. Apparatus according to claim 3, in which said drawing surface comprises vapor-deposited metal coating on a transparent dielectric sheet; in which said drawing means comprises a stylus for locally removing said coating, whereby upon making the drawn outline, the coating within the outline is electrically insulated from the coating outside the outline; and in which said probing means responds to detected discontinuity in electrical conductivity of said surface in the course of scanning the same.

5. Apparatus according to claim 4, in which said probe means comprises a conductive peg on the instantaneous scan axis and in an electrical circuit which includes a voltage source, an electrical resistance, and said surface in the region outside the drawn outline.

6. Apparatus according to claim 4, in which the connection of said photoelectric means to said measuring device includes a trigger, and a control connection from said probe means to said trigger.